(12) United States Patent
Patrick

(10) Patent No.: US 6,339,448 B1
(45) Date of Patent: Jan. 15, 2002

(54) CABLE-WAY MOBILE SURVEILLANCE CAMERA SYSTEM

(76) Inventor: Gregory Patrick, 1305 E. 124th, Cleveland, OH (US) 44106

( * ) Notice: Subject to any disclaimer, the term of this patent is extended or adjusted under 35 U.S.C. 154(b) by 0 days.

(21) Appl. No.: 09/324,716

(22) Filed: Jun. 3, 1999

(51) Int. Cl.[7] .............................. H04N 7/18; H04N 9/47
(52) U.S. Cl. ........................................ 348/143; 348/148
(58) Field of Search .................................. 348/143, 144, 348/145, 146, 147, 148, 149, 150, 151, 152, 153, 154, 155, 156, 82, 83, 84, 85; 340/425.5, 539

(56) References Cited

U.S. PATENT DOCUMENTS

| | | | | |
|---|---|---|---|---|
| 5,018,009 A | * | 5/1991 | Koerv | 358/100 |
| 5,786,750 A | * | 7/1998 | Cooper | 340/425.5 |
| 5,825,412 A | * | 10/1998 | Hobson et al. | 348/149 |
| 6,064,428 A | * | 5/2000 | Trosino et al. | 348/128 |

* cited by examiner

*Primary Examiner*—Andy Rao
(74) *Attorney, Agent, or Firm*—Patent & Trademark Services; Thomas Zack; Joseph H. McGlynn

(57) ABSTRACT

An unmanned visual monitoring system used outdoors to patrol large expanses of space such as along highways, fences, railroad lines, rivers, borders, beaches, etc. Guidance and support for the unmanned surveillance camera carriage vehicle, as well as the electrical power for its operation, are provided to the carriage and camera by conductive track cables. Spaced superstructures having upright poles and a cantilever extension placed along the track system length act to vertically support the system above the ground. At a remote control center location from the carriage, an operator can control the movement of the vehicle and the operation of the video camera. Operational electrical power for moving the carriage and controlling the camera's movement are supplied via power lines connected at different polarities to the track cables of the track system.

6 Claims, 3 Drawing Sheets

CABLE-WAY MOBILE SURVEILLANCE CAMERA SYSTEM

BACKGROUND OF THE INVENTION

This invention relates to a visual camera surveillance system that rides along track cables. The operation of the camera system is controlled from a remote location. Such movable unmanned cameras would find particular application in remote outdoor locations where having a camera operator on site would be expensive and not practical due to weather or other conditions. Examples of outdoor locations that would employ such movable camera systems include highways, fences, railroads, rivers, border crossings, beaches, etc.

Visual surveillance systems using video camera are known. Some such systems use an on site video camera whose data is continuously recorded and then preserved or erased to make room for other subsequent data depending on whether or not an awaited event occurred during the recording on that recording period.

In another vision processing system traffic flow is detected and monitored by generating successive images of sections of the roadway, transducing the images into arrays of pixels where each pixel has a luminance value and then summing the values for all pixels. These summed values are then compared to a reference value to generate data when the difference is great enough.

Another road section monitoring system recognizes obstacles in the road such as wave flooding, land slip, etc. Data based on the detected obstacles, measured are taken and drivers informed of the results.

Another traffic surveillance process and device is used to measure the speed of a vehicle within a traffic scene, optically record the traffic scene, and reproduce the traffic scene on a display in synchronism with the display of the measured speed.

DESCRIPTION OF THE PRIOR ART

Devices that record and transmit visual images from remote locations are known. For example, in the U.S. Pat. No. 4,977,451 to Besnard an on site video camera is used to continuously recorded and then conserved or erased data sections to make room for other subsequent data depending on whether or not the awaited event occurred during the recording on in a section.

U.S. Pat. No. 5,296,852 to Rathi discloses a vision processing system wherein traffic flow is detected and monitored by generating successive images of sections of the roadway, transducing the images into arrays of pixels with each pixel having a luminance value and then summing the values for all pixels. These summed values are then compared to a reference value to generate data when the difference is great enough.

U.S. Pat. No. 5,486,819 to Horie discloses a road obstacle monitoring device which recognizes obstacles in the road such as wave flooding, land slip, etc. Data based on the detected obstacles are measured and drivers are informed of the results.

U.S. Pat. No. 5,767,794 to Borsch et al. discloses a traffic surveillance process and device used to measure the speed of a vehicle within a traffic scene, optically record the traffic scene, and reproduce the traffic scene on a display in synchronism with the display of the measured speed.

In contrast to such visual processing systems, the present invention utilizes a movable carriage for a video camera which rides along a track system. The carriage's operation and the transported camera are both controlled from a remote location all as detailed hereafter.

SUMMARY OF THE INVENTION

This invention relates to a remotely controlled camera and a carriage mount for the camera which move along a track system that supplies electrical power to operate the carriage and the camera.

It is the primary object of the present invention to provide for an improved visual surveillance system for remote locations.

Another object is to provide for such a system wherein a remotely controlled camera is transported by a movable carriage that rides along a track system which provides guidance and support for the carriage.

These and other objects and advantages of the present invention will become apparent to readers from a consideration of the ensuing description and the accompanying drawings.

DESCRIPTION OF THE PREFERRED EMBODIMENT

Figure 1:
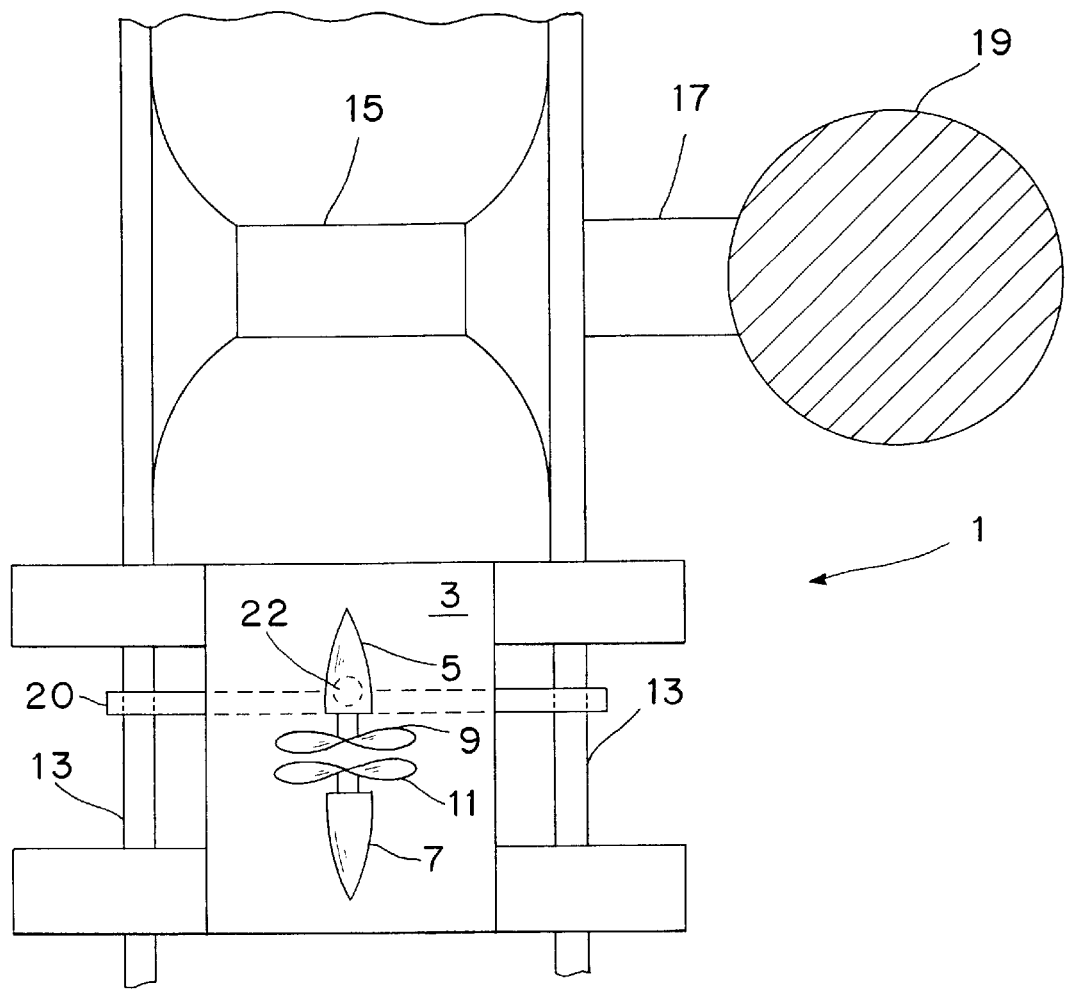
FIG. 1 is a top view of the surveillance camera vehicle and part of the track system of the present invention.

FIG. 1 is a top view of the surveillance camera vehicle and part of the track system of the present invention. The surveillance camera vehicle 1 acts as the carriage to transport the video camera (not shown in this view) which rides underneath the carriage. Shown supported and fixed to the top of the carriage's flat platform 3 are two facing spaced electric motors 5 and 7 each of which is used to operate two facing propellers 9 and 11, respectively. Supporting the carriage 1 are two spaced parallel track cables 13. These cables are in turn supported above the ground by a superstructure 15 which extends between the cables and is mounted by a bracket 17 to the upright vertical member 19, shown in cross section. Member 19 can be an existing upright member, such as a wooden utility pole, or may be a member specifically placed into the ground to extend upwardly therefrom to provide vertical support for superstructure is and the tracks system 13.

Conventional electrical conduits within the internal structure of the tracks 13 are used to supply electrical power to run the propeller operating electrical motors 5 and 7. By operating one of these motors at a time, the propeller for that motor propels the carriage 1 in one direction along the tracks 13. In a complete track system there would be many spaced vertical members 19 located along the path of desired travel each having a cantilevered bracket 17 and superstructure 15 to suspend the attached tracks 13 above the ground. Between the tracks 13 and the bottom of platform 3 is a track spanning rubber bar member 20 carried with and attached to the platform. A conventional electrically operated solenoid 22 fixed to the bar member 20 and the platform 3 causes the bar to reciprocate vertically when actuated to contact the tracks 13 and act as a brake to stop the movement of the carriage. Normally, the solenoid 22 and its carried bar 20 are spaced above the lower tracks 13 as the carriage moves along the tracks and then lower when stopping of the carriage is desired.

Figure 2:
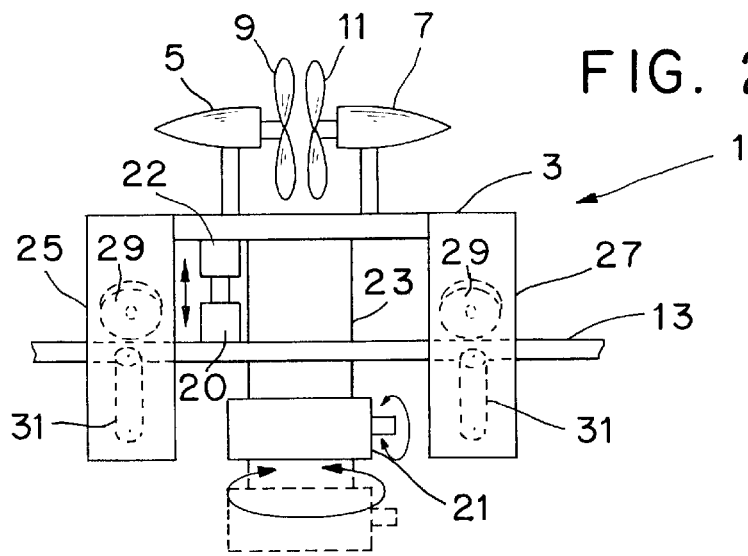
FIG. 2 is a side view of the surveillance camera vehicle of FIG. 1 along with the carried camera.

FIG. 2 is a side view of the surveillance camera vehicle 1 of FIG. 1 along with its carried lower conventional video camera 21 having power zoom and focusing capabilities. The vertical support structure 23 extending from the platform 3 for the depending camera 21 can be moved upward and downwardly like a telescope or rotated by an internal conventional electrically powered motor (not shown) when in use to allow for a completely unobstructed view by the camera. The same support structure also allows the camera to be independently rotated around a center axis 360 degrees when in its surveillance mode. To prevent damage to the camera while traveling along the supporting tracks 13, the camera is normally retained in an elevated position, as shown, with respect to the ground such that the carriage sides 25 and 27 provide some lateral protection. When in a lowered position, shown by the dotted lines, the camera 21 is in its observation mode and has an unobstructed view in all directions.

The rigid depending carriage sides 25 and 27 function to support the platform 3 above the tracks 13. Two sets of identical rollers whose axles are mounted to the sides 25 and 27 engage the circular in cross section tracks 13 on each track side. The upper track engaging rollers 29 (shown in dotted line format) are large diameter short rollers while the lower track engaging rollers 31 are two long rollers of smaller diameter (also, shown in dotted line format). The end of rubber carriage stopping bar 20 is shown in its lowered track engaging position with the attached solenoid 22 above the bar. The parallel spaced rear track 13 immediately behind the front track 13 in FIG. 2 is not shown but would have the same identical depending carriage sides and two sets of rollers to support the rear side of carriage 1. This set up allows the supported carriage 1 to moved along the support guide way formed by the tracks 13 in an almost frictionless fashion when one of the propellers is operated to cut through the air to drive the carriage along the tracks. To stop the moving carriage, the solenoid is actuated to lower its carried stopping bar 20 into engagement with the tracks, as shown. When movement of the carriage is desired again, the bar is raised by deactivating the solenoid.

Figure 3:
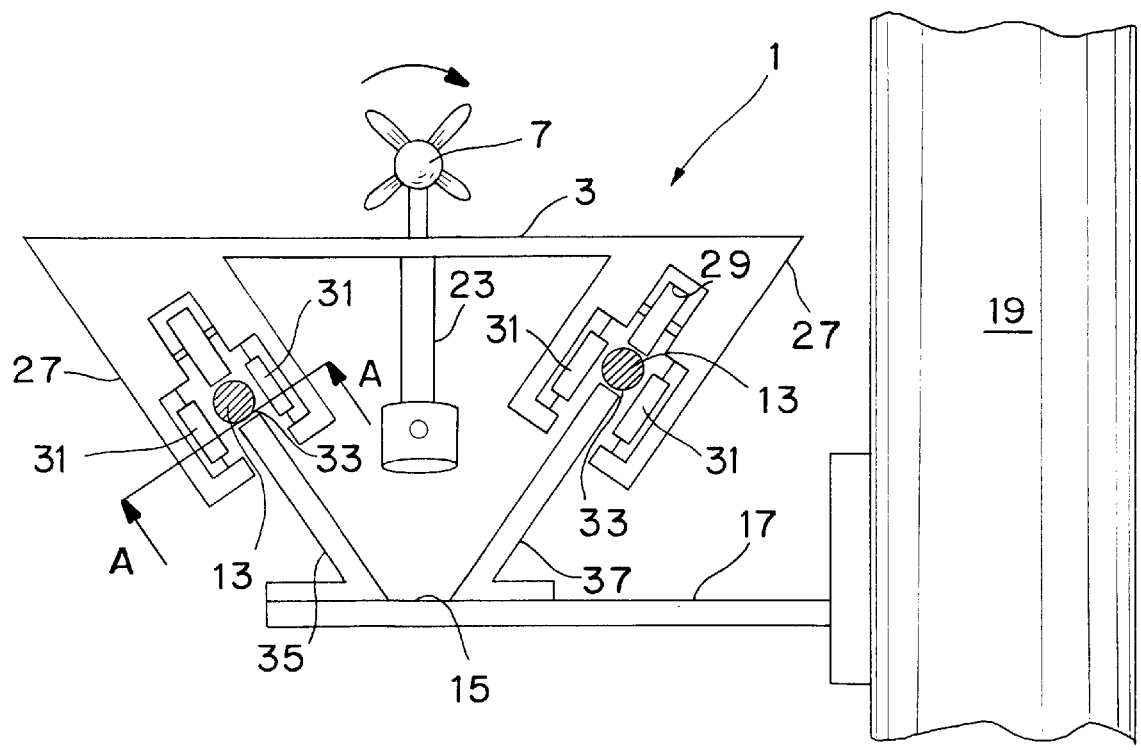
FIG. 3 is a end view of the surveillance camera vehicle of FIG. 1 along with the carried camera.

FIG. 3 is a end view of the surveillance camera vehicle or carriage 1 of FIG. 1 along with the carried camera 21. The two identical inwardly and downwardly slanting sides 27 for the carriage 1 have cut out internal portions that are shaped to receive the axles for the three rollers 29 and 31. The axle for each of the two shown larger diameter rollers 29 extends through the roller at its center and is journal led at its ends into the cut out portion of the side 27. Below each of these large diameter rollers are two smaller diameter rollers 31 that are elongated in appearance as shown. Each of the three rollers for each carriage side bear against the track 13 whose circular cross section is shown. Thus there are twelve rollers in all, six on each side of the two carriage sides, as shown in FIG. 3, that engage the two spaced tracks at four different locations along the carriage's undersurface. The upper extending free ends 33 for each of the two bracket extensions 35 and 37 are fixed to the rounded cables 13 to vertically support them. By making the lower gap between adjoining two inwardly facing sides of the cut out portions (just below the extension ends 33) for each carriage side 27 smaller than the diameter of the enclosed cable 13 the carriage cannot be dislodged from the supporting lower cable but may ride along its length. The carried solenoid actuated braking system (solenoid 22 and rubber bar 20) located between the roller 29 and the vertical support structure 23 over the tracks has been omitted from this view to simply the figure.

Figure 4:
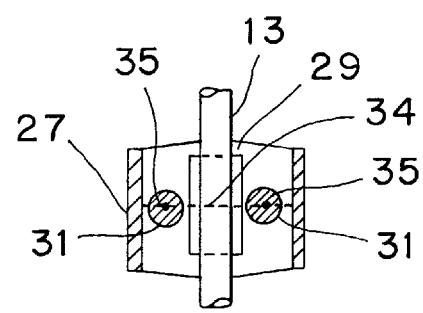
FIG. 4 is an enlarged view of the rollers as they engage the cable shown in FIG. 3.

FIG. 4 is an enlarged view of the three rollers as they engage the cable 13 shown in FIG. 3. Looking in the direction of the arrows A—A in FIG. 3 upwardly along the length of bracket extensions 35 and 37, the circular cross section cable 13, a section of which is shown, would have its upper surface in engagement with the roller 29. A center axle 34 extends through roller 29 and is journal led at its two opposite ends into the upper cut out portion of side 27. Closer to the observer on both sides of the cable 13 are the two identical rollers 31. Axles 35 extends through the length of each roller 31 and have their opposite ends journal led into upper and lower cut out sides. The side rollers 31 are slightly spaced from the cable 13 and may engage the cable if the carriage 1 tilts slightly when moving along the cable 13.

Figure 5:
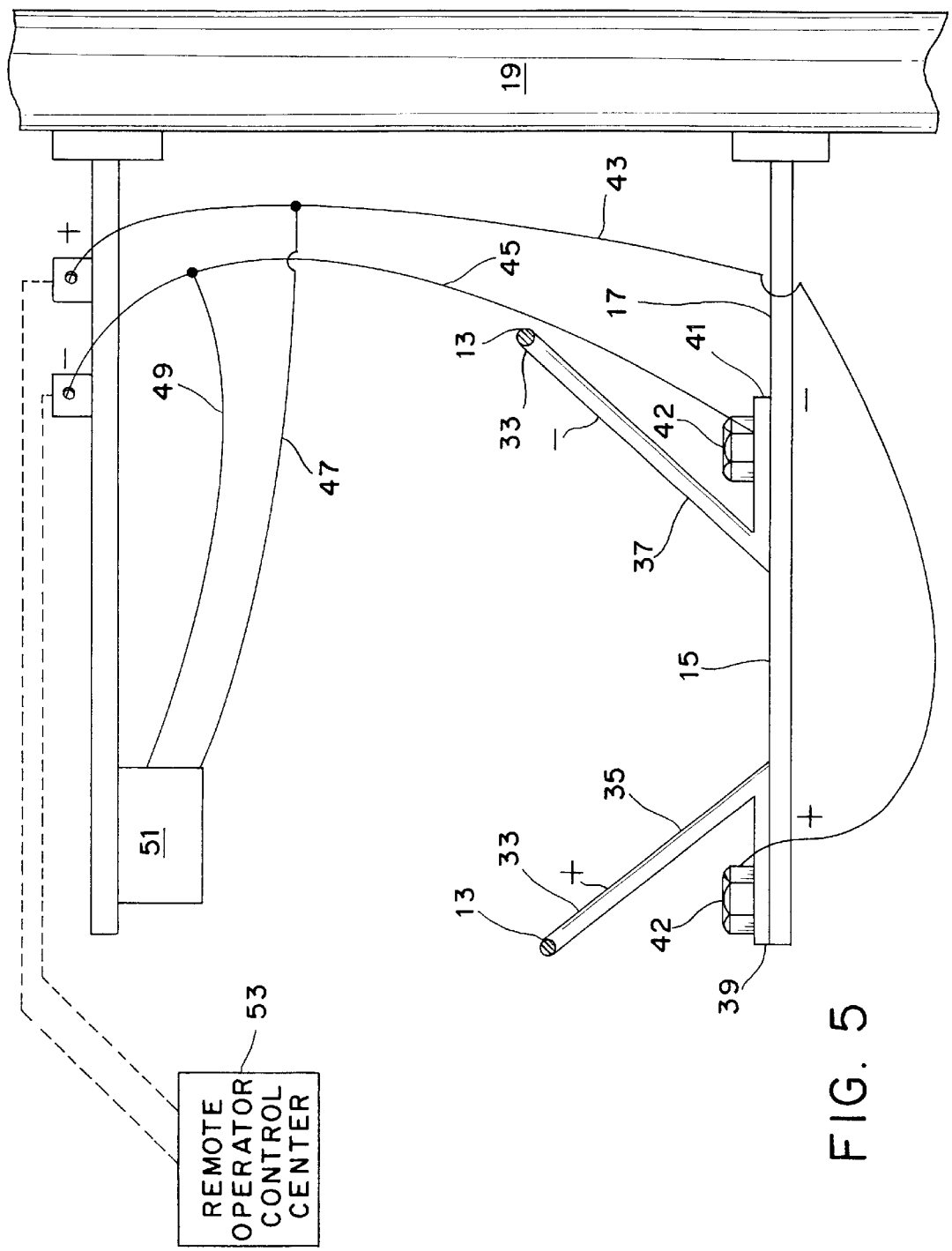
FIG. 5 is a schematic representation of how electric power can be supplied to the tracks.

FIG. 5 is a schematic representation of how electric power can be supplied to the tracks to provide for the operation of the carriage and the transported camera. The carriage 1 and its attached camera are not shown in this figure but receive electrical power through conventional internal wiring connections in the carriage. Each of the two extension brackets 35 and 37 have their upper terminal free ends 33 fixed to the carriage 1 supporting track cable 13. Each of the extension brackets have lower base portions 39 and 41, respectively, that are bolted or otherwise fixed mounted on support member 15. Both the extensions 35 and 37 and their connected bases are made of electrically conductive material such as steel, cooper, aluminum, etc. The base supporting and connecting lower member 15–17 and the upright member 19 are all made of an electrically insulating material such as fiberglass, wood, plastic, etc. Power lines 43 and 45 are connected to the bolts 42 which are used to fix the two bases to lower members 15–17. Each power line is connected to a separate holder having different electrical polarities. Thus, line 45 has a negative polarity while line 43 is given a positive polarity. Both lines are also connected to the remote operator's control center 53. Separately connected to each of the power lines 43 and 45 are two other power lines 47 and 49. These latter lines 47 and 49 are internally wired to a conventional intermediate electronic unit 51 which functions as a nearby controller to regulate the signals sent to and from the camera and to control the power being supplied from hot lines 43 and 45 to the carriage and its transported camera 21. Many of the individual subcomponents used to control the movement and stopping of the carriage 1 and the movement of the camera are conventional. For example, the mechanisms to control the movement of the carriage 1 along the tracks and the stopping solenoid 22 and its attached rubber bar 20 which frictionally engages the tracks 13 are all off-the-shelf items. Also, conventional are the specific electrically operated mechanisms used to lower, raise and rotate the camera 21. When spaced long distances apart, like miles, each spaced superstructure could have essentially the same set up to receive and control the movement of the carriage and its associated camera and to receive and record signals at the remote location 53 of visual images detected along the way of the track system.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An unmanned visual monitoring system comprising:

an elevated track system having a length and adapted to support and guide the movement of a carriage along the track system's length, said track system including two separate and spaced rails;

a carriage mounted and movable along said elevated track system, said carriage having its movement along the track system controlled from a remote location;

carriage propelling means fixed to said carriage and remotely controlled to control the movement of said carriage along the length of said track system;

carriage stopping means fixed to said carriage and remotely controlled to stop the movement of said carriage along the length of said track system;

a video camera mounted under said carriage and movable along the track system with said carriage;

means for vertically supporting said elevated track system at distinct separated and spaced locations along the length of the track system; and electrical power supply means connected to said track system along its length for supplying electrical power to operate the movement of the carriage along the track and to operate the video camera.

2. The visual monitoring system as claimed in claim 1, wherein said carriage propelling means fixed to said carriage includes a first and a second electrically operated fan motor, said first fan motor having a first rotatably mounted propeller and said second fan motor having a second rotatably mounted propeller, said first propeller being operable to propel the carriage along the track system in one direction that is opposite from the direction the second propeller can propel the carriage along the track system.

3. The visual monitoring system as claimed in claim 2, wherein said carriage stopping means includes a solenoid actuated braking system having a bar with rubber which can engage the track system.

4. The visual monitoring system as claimed in claim 2, wherein said video camera mounted under said carriage has a power zoom lens and image focusing capability that can be remotely operated.

5. The visual monitoring system as claimed in claim 2, wherein said means for vertically supporting said elevated track system includes an electrically insulated upright support with a cantilevered electrically insulated arm member extending therefrom, said means for vertically supporting said elevated track system also including two track engaging separated extensions that are electrically conductive with different electrical polarities.

6. The visual monitoring system as claimed in claim 2, wherein said carriage is mounted for movement along said elevated track system by a plurality of track engaging rollers on the carriage, said rollers engaging each of the tracks on both the upper and sides of the track.

* * * * *